United States Patent
Rakov et al.

(10) Patent No.: US 7,508,197 B1
(45) Date of Patent: Mar. 24, 2009

(54) BRUSHLESS REACTANCE SENSORS FOR INDICATING ANGULAR POSITION

(76) Inventors: Mikhail Rakov, 150 Alma St., #215, Menlo Park, CA (US) 94025; Takashi Shinano, 11025 S. 51st. St., Tempe, AZ (US) 85044

( * ) Notice: Subject to any disclaimer, the term of this patent is extended or adjusted under 35 U.S.C. 154(b) by 76 days.

(21) Appl. No.: 11/724,951

(22) Filed: Mar. 15, 2007

(51) Int. Cl.
*G01B 7/30* (2006.01)

(52) U.S. Cl. .............................. 324/207.25; 73/514.39

(58) Field of Classification Search ............ 324/207.25, 324/258–259, 658, 661–662; 73/514.31, 73/514.39, 779–780, 862.331, 862.337; 361/298.1, 361/299.1, 306.3

See application file for complete search history.

(56) References Cited

U.S. PATENT DOCUMENTS

| | | |
|---|---|---|
| 5,384,527 A | 1/1995 | Rozman et al. |
| 5,872,408 A | 2/1999 | Rakov |
| 5,914,578 A | 6/1999 | Rakov |
| 6,101,084 A | 8/2000 | Rakov |
| 6,140,793 A | 10/2000 | Carr et al. |
| 6,525,506 B2 | 2/2003 | Jin |
| 7,276,897 B2 * | 10/2007 | Lee ..................... 324/207.17 |
| 7,282,878 B1 | 10/2007 | Rakov et al. |
| 2002/0171381 A1 | 11/2002 | Miyazaki et al. |
| 2004/0155613 A1 | 8/2004 | Sugiyama et al. |

OTHER PUBLICATIONS

U.S. Appl. No. 12/044,835, filed Mar. 7, 2008, Inventors: Rakov et al.
Hendershot, Jr. et al., *Design of Brushless Permanent-Magnet Motors*, Magna Physics Publishing (1994), pp. 1-19.
Kenjo, *Electric Motors and Their Controls*, Oxford University Press (1991), pp. 1-13.
Leonhard, *Control of Electrical Drives*, 2nd ed., Springer Verlag (1996), pp. 75-77 and pp. 155-177.

* cited by examiner

*Primary Examiner*—Bot LeDynh
(74) *Attorney, Agent, or Firm*—Townsend and Townsend and Crew LLP

(57) ABSTRACT

Angular position detection sensors include a capacitive sensor embodiment and an inductive sensor embodiment. A non-rotating excitation element is electromagnetically coupled to a non-rotating receiver element. The electromagnetic coupling is varied by an electrically passive, rotating element disposed between the non-rotating excitation element and the non-rotating receiver element. Excitation signals applied to the non-rotating excitation element are electromagnetically coupled to the non-rotating receiver element, producing a single output signal directly indicative of the angular position of the rotating element.

25 Claims, 7 Drawing Sheets

BRUSHLESS REACTANCE SENSORS FOR INDICATING ANGULAR POSITION

CROSS REFERENCE TO RELATED APPLICATIONS

The present invention is related to U.S. Pat. No. 5,872,408, Feb. 16, 1999 and Capacitive Rotary Coupling, U.S. Pat. No. 6,101,084, Aug. 8, 2000, both of which are fully incorporated herein by reference for all purposes. The present invention is also related to pending U.S. application Ser. No. 11/413,420, filed Apr. 28, 2006 which is fully incorporated herein by reference for all purposes.

BACKGROUND OF THE INVENTION

The present invention is directed generally to the detection of angular position, and in particular to the use of reactance sensors to indicate the angular position of the rotary elements of rotational devices.

Control of rotational electromechanical devices, including electrical motors, requires determining the position and speed of their axes and rotors. There are several ways to determine such parameters. First, the position of the rotor may be determined by an array of photo-transistors and a special shutter coupled to the rotor shaft, or by using Hall-effect sensors. Such systems are described in T. Kenjo, Electrical Motors and Their Controls, Oxford University Press (1994), pp 176 and following. Second, the speed informative signal may be obtained by using a small permanent magnet tachometer generator, attached to the shaft, or by using magnetic or optical sensors for generating pulses for each angular increment of the rotor. Such systems are described in W. Leonhard, Control of Electrical Drives, 2nd ed., Springer Verlag (2001), pp 420 and following. Third, a resolver may be used to determine the position of the rotor by a two-phase (sine/cosine) signal at a carrier frequency modulated sinusoidally by the rotation of the rotor. Such a system is described in J. R. Hendershot, Jr. and T. Miller, Design of Brushless Permanent—Magnet Motors, Magna Physics Publishing (1994), pp 1-19. All these methods require precise mechanical placement of sensors, or galvanic contact between moving parts.

Conventionally, the moveable element of a rotary device is the informative element that indicates rotational (angular) position; i.e., the information signal (an electrical signal) is generated on the moveable element. It is therefore necessary to have some means for transferring the information signal from this moveable element to external processing circuitry. This is usually accomplished by the use of rings and brushes, flexible connectors, and so on. The use of brushes can introduce noise into the information signal. Brushless solutions exist, but they suffer from low signal to noise ratios, and can be mechanically cumbersome. More significantly, brushes create problems with reliability and require constant maintenance. It is highly desirable to form and deliver signals to and from the rotating parts of mechanical or electromechanical devices without the use of mechanical or galvanic contact and a complex sensor supporting system.

BRIEF SUMMARY OF THE INVENTION

The present invention provides reactance (capacitive and inductive) sensors for measuring angular position of components of mechanical and electromechanical devices.

This invention refers to reactance (capacitive and inductive) sensors indicative of angular position of rotational devices, specifically axes of their moving parts, and more specifically of angular position of rotors of electrical motors of different types, and of other electromechanical motion devices.

In accordance with the present invention, a sensor includes a non-moving sensing element from which the informative signal indicative of the angular position is obtained. A passive moveable element is introduced between the non-moving sensing element and a source of electromagnetic energy. The passive element has special electromagnetic characteristics which affect the reactance coupling (i.e., electromagnetic coupling) of the electromagnetic excitation between the non-moving sensing element and the source of electromagnetic energy.

Following the principle of duality of electromagnetic fields, a sensor according to the present invention can be capacitive or inductive. The movable passive element can be characterized by having a dielectric constant for capacitive variants, or a magnetic constant for inductive variants. Both of these variants of reactance sensors have similar constructions, identical forms of excitation and output informative signals.

According to the present invention those elements of the angular position sensor that require an electrical connection do not rotate. This is a significant advantage because the present invention obviates the need for brushes or the like which would be used to provide electrical contact to rotating surfaces and the disadvantages of having to use such brushes.

DETAILED DESCRIPTION OF THE INVENTION

The foregoing problem was recognized and essentially solved in M. Rakov, Capacitive Sensor for Indicating Position, U.S. Pat. No. 5,872,408, Feb. 16, 1999, and in M. Rakov, Capacitive Rotary Coupling, U.S. Pat. No. 6,101,084, Aug. 8, 2000, both of which are fully incorporated herein by reference. The general approach was based on using the phase of output signal of sensor as a unified information parameter. Different configurations of reactance (capacitive and inductive) sensors were proposed. These sensors were characterized by uniformity of information signal, high reliability and low maintenance costs because of absence of contacts or brushes, and simple construction that allowed them to be practically implemented using modern methods of mass production. With these two patents as the foundation of present patent application, the present invention discloses a further improvement of such sensors.

Figure 1:
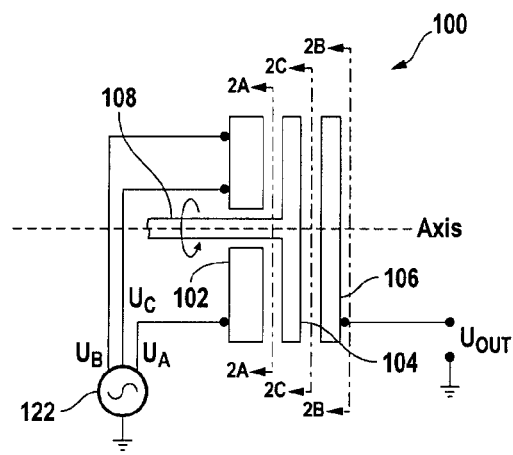
FIG. 1 shows a planar embodiment of a capacitive angular position sensor according to the present invention.

FIG. 1 illustrates an embodiment of an angular position sensor 100 according to the present invention. In this particular embodiment, the sensor 100 is a capacitive sensor. The side-view illustration of FIG. 1 is illustrative. The figure shows a sensor 100 having a planar construction, and in particular a disk-shaped construction. The sensor 100 comprises a rotating element 104 and a non-rotating excitation element 102 and a non-rotating receptor element 106. In this particular embodiment, the rotating element 104 is positioned between the excitation element 102 and the receptor element 106, and is spaced apart from the excitation element 102 and from the receptor element 106. One of ordinary skill will readily appreciate that other shapes may be equally suitable.

The rotating element 104 is attached to a shaft 108. Rotation of the shaft 108 about its axis of rotation causes the rotating element 104 to rotate. An opening is provided through a center portion of non-rotating excitation element 102, through which the shaft 108 passes. This allows the shaft 108 to be mechanically connected to a device for which detection of its angular position is desired. For example, the shaft can be connected to the rotor of a brushless DC motor, whose operation requires knowledge of the angular position of its rotor.

Figure 1A:
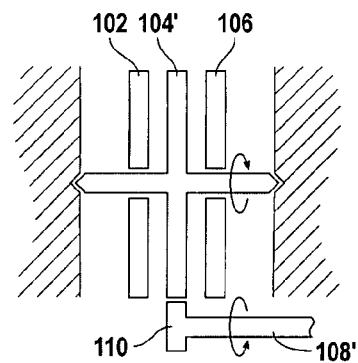
FIG. 1A illustrates a variation of the embodiment shown in FIG. 1.

Alternatively, the shaft 108 passes can through an opening provided in the receptor element 106. Other embodiments for driving the rotating element 104 are possible, of course. For example, FIG. 1A shows an embodiment where the rotating element 104' is a geared element that is driven by another gear 110. A rotating shaft 108' is attached to the gear 110 to drive the rotating element 104'. It should be apparent that this specific implementation detail is not relevant to the present invention. Any suitable configuration that allows for rotation of the rotating element 104 that does not require rotating the excitation element 102 or the receptor element 106 is appropriate.

FIG. 1 also shows a multiphase signal generator 122 for providing two or more input signals to the excitation element 104. In this particular embodiment, the signal generator 122, or other suitable source of signals, is configured to provide three input signals $U_A$, $U_B$, and $U_C$ to the excitation element 102. The figure further shows that the receptor element 106 provides a single output signal $U_{OUT}$.

Figure 2A:
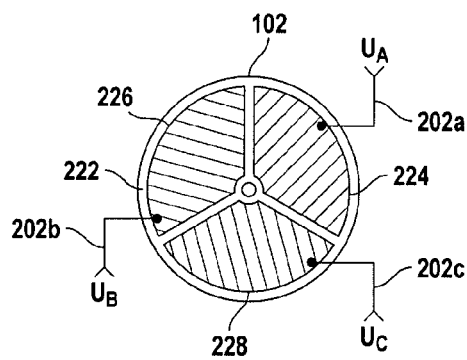
FIGS. 2A-2D show views of components comprising the sensor of FIG. 1.
Figure 2B:
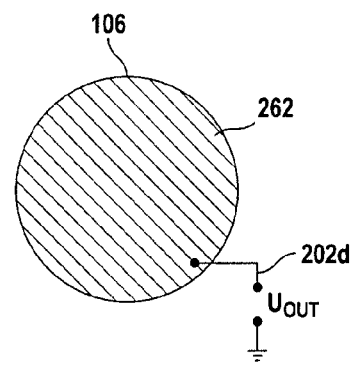
Figure 2C:
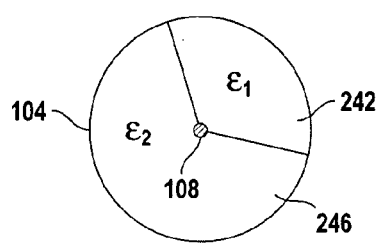

FIGS. 2A to 2C show additional details of the sensor 100 viewed along respective view lines 2A-2A, 2B-2B, and 2C-2C shown in FIG. 1. FIG. 2A is a face-on view (viewed along view lines 2A-2A), showing further detail of excitation element 102. In accordance with the present invention, the excitation element 102 is configured to emit a plurality of electromagnetic fields during operation of the sensor 100. The specifically disclosed embodiment of the excitation element 102 is a disk-shaped element comprising three electrically isolated emitting elements. It will be understood, however, that the excitation element 102 is not necessarily disk-shaped and can comprise more than three such emitting elements, or a few as two emitting elements. For purposes of explanation, the discussions which follow will assume a three-element configuration and three-phase excitation.

As shown in FIG. 2A, the excitation element 102 comprises an underlying disk-shaped substrate 222 of nonconductive material. Disposed on the substrate 222 are three separate electrically conductive regions 224, 226, 228, which divide the disk into equal areas and constitute the emitting elements in this particular embodiment of the invention. Each conductive region is substantially a 120° sector. The three electrically conductive regions 224, 226, 228 are electrically isolated from each other. Each of the input signals $U_A$, $U_B$, and $U_C$ produced by the signal generator 122 is provided respectively to one of the electrically conductive regions 224, 226, and 228; for example, by way of a wire connection. It will be appreciated that other implementations of the emitting elements are possible.

FIG. 2B shows a face-on view (viewed along view lines 2B-2B) of the receptor element 106. In accordance with the present invention, the receptor element 106 is configured to output a single output signal. The particular implementation of the receptor element 106 shown in FIG. 2B illustrates a single disk-shaped element of electrically conductive material 262. The electrically conductive material 262 can be disposed on a substrate (not shown) for mechanical stiffness. Although the shape of receptor element 106 is shown to match the shape of the excitation element 102, it will be apparent that the present invention does not impose such a restriction of matching shapes.

Since the excitation element 102 and the receptor element 106 do not rotate, it is a simple matter to provide electrical connections to these elements to energize the emitter regions of the excitation element 102 and to measure or otherwise sense the single output signal $U_{OUT}$ on the receptor element 106. For example, FIG. 2A shows wires 202a, 202b, 202c soldered or otherwise electrically connected respectively to the conductive regions 224, 226, 228. In this way, a source of signals such as signal generator 122 can provide individual signals respectively to the conductive regions 224, 226, 228 without the need for brushes as compared to conventional devices where the excitation element is a moving part.

FIG. 2B similarly shows a wire 202d soldered or otherwise electrically connected to the electrically conductive material 262. In this way, the output signal $U_{OUT}$ that appears on receptor element 106 can be measured or otherwise detected by a suitable detection device (not shown) without the need for brushes as compared to conventional devices where the receptor element is a moving part. In a practical application of the present invention, the output signal can be fed into a controller (not shown) which would then perform control functions based on the measured output signal.

FIG. 2C shows a face-on view (viewed along view lines 2C-2C) of rotating element 104. This disk-shaped element comprises a first portion 242 and at least a second portion 246. The shaft 108 can be seen in cross-section. The first portion 242 is a 120° sector having proportions that match the proportions of each conductive region 224, 226, 228. The first portion 242 is a dielectric material characterized by a dielectric constant $\in_1$. Practically, the dielectric constant should be sufficiently greater than that of air which is defined by the constant of $\in_0$. The second portion 246 is a material different from the material of the first portion 242. The material of the second portion can be a non-dielectric material, or it can be a dielectric material having a dielectric constant $\in_2$ different from $\in_1$. The rotating element 104 can in fact comprise three or more portions.

Figure 2D:
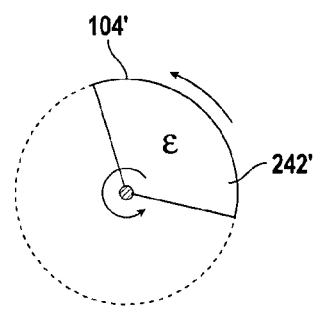

FIG. 2D shows an alternate embodiment of the present invention wherein a rotating element 104' comprises only a 120° sector 242' having proportions that match the proportions of each conductive region 224, 226, 228. The sector 242' is connected to or is integral with the shaft 108. When the shaft 108 is rotated, the sector 242' rotates as well.

In operation, the input signals $U_A$, $U_B$, and $U_C$ produced by the signal generator 122, or other suitable source of signals, are applied respectively to the conductive regions 224, 226, 228 of the excitation element 102. For example, FIG. 2B shows that input signal $U_A$ is applied to conductive region 224, input signal $U_B$ is applied to conductive region 226, and input signal $U_C$ is applied to conductive region 228. Since the conductive regions 224, 226, 228 are electrically isolated from each other, three separate electromagnetic fields will emanate from the excitation element 102.

Figure 3:
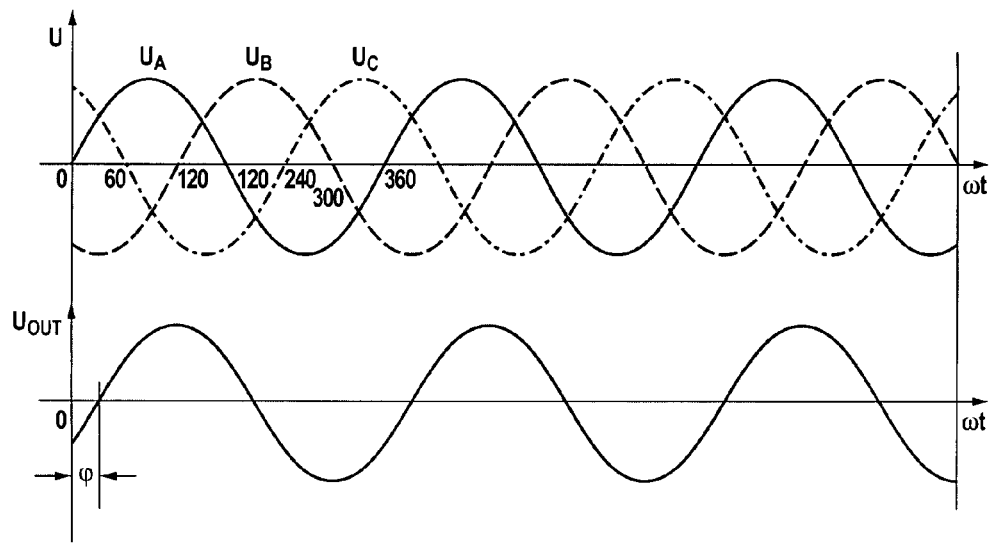
FIG. 3 illustrates examples of excitation signals, and an example of an output signal.

In this particular embodiment, the input signals $U_A$, $U_B$, and $U_C$ are harmonic signals which are 120° out of phase with respect to each other. This is illustrated in FIG. 3. Input signal $U_B$ is seen to be shifted in phase by 120° relative to input signal $U_A$. Input signal $U_C$ is 120° phase shifted relative to input signal $U_B$. Thus, excitation element 102 can be said to be driven by a polyphase excitation signal, and in this particular embodiment by a three-phase excitation signal, where each phase is defined as follows:

$$U_A = U_M \sin \omega t$$

$$U_B = U_M \sin(\omega t + 120°)$$

$$U_C = U_M \sin(\omega t + 240°) \qquad \text{EQN 1}$$

where $U_M$ is a predetermined amplitude. However in general, excitation element 102 can comprise N emitter regions that are driven by an N-phase input signal.

The embodiment of FIG. 1 is a capacitive sensor, so the electromagnetic fields are electric in nature, and are also referred to as electric fields. The presence of the three electric fields emanating from the excitation element 102 causes charge variations on the conductive material 262 of the receptor element 106. Since the electric fields are time-varying, the receptor element 106 will experience variations in charge. These variations in the charge can be measured to produce the single output signal $U_{OUT}$ by measuring the voltage potential of the conductive material 262. Since the input signals $U_A$, $U_B$, and $U_C$ are time-varying signals, each of the three electric fields emanating from excitation element 102 is time-varying. The output signal $U_{OUT}$ of the receptor element 106 is therefore a single time-varying voltage that is the result of the combined effect of the three electric fields on the conductive material 262. FIG. 3 shows an example of the output signal $U_{OUT}$ of the receptor element 106.

As with any capacitor, the dielectric material affects the rate of variation of charge. In accordance with the present invention, the rotating element 104 is the dielectric. Recall from FIG. 2C, the rotating element 104 is not entirely of a single dielectric material. The first portion 242 of the rotating element 104 is dielectric material characterized by one dielectric constant $\in_1$, while the remaining portion 246 is of another material and is characterized by a different dielectric constant $\in_2$. FIG. 2D shows that the rotating element 104' can simply comprise only the sector 242' of a single dielectric material of dielectric constant $\in$.

As the rotating element 104 (or 104') rotates, the position of the dielectric material between the conductive regions 224, 226, 228 of the excitation element 102 and the electrically single conductive material 262 of the receptor element 106 will continually change. Consequently, different portions of the sensor 100 will have different capacitances as the rotating element 104 sweeps a circular path. The effect created by turning the rotating element 104 can be seen as phase shifts in the output signal $U_{OUT}$ of the receptor element 106.

Figure 4:
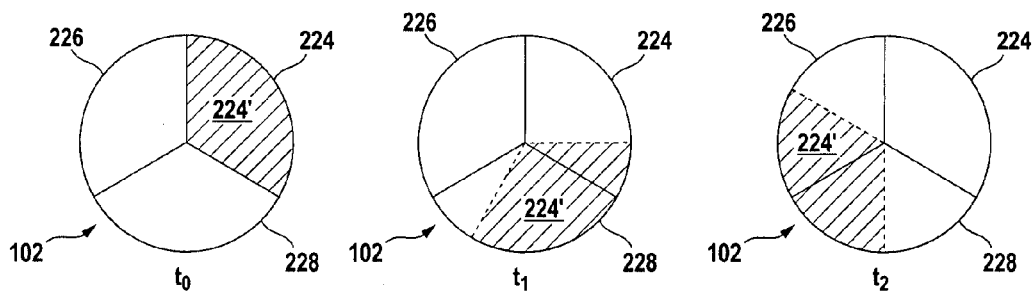
FIG. 4 illustrates operation of the sensor of FIG. 1.

This effect can be seen by the sequence illustrated in FIG. 4. To simplify the illustrations, the sequence shows turning of the rotating element 104' as illustrated in FIG. 2D. The rotating element comprises only a sector 242' of dielectric material (shown here as the shaded element). At time $t_0$, the sector 242' is maximally aligned with conductive region 224 of the excitation element 102, as energized by the configuration shown in FIG. 2A. Consequently, the electric field produced by the conductive region 224 will be maximally coupled via the sector 242' to the receptor element (not illustrated in this figure), while the electric fields from the other conductive regions 226, 228 will be coupled to the receptor element to a very much lesser extent. Assuming that the excitation element 102 is energized as shown in FIG. 2A, the output signal $U_{OUT}$ will be primarily determined by the response of the input signal $U_A$ to the capacitance created by the three elements: conductive region 224, dielectric material of the sector 242', and receptor element (not shown).

At time $t_1$, the sector 242' is shown to have moved to a location that partially overlaps with conductive regions 224, 228. Consequently, the electric fields produced by the conductive regions 224, 228 will be coupled via the sector 242' to the receptor element (not shown), while the electric field from conductive region 226 will be coupled to the receptor element to a much smaller extent. The output signal $U_{OUT}$ will be largely determined by the action of the input signals $U_A$, $U_C$ on their respective capacitances created by the conductive regions 224, 228, the dielectric material of the sector 242', and the receptor element.

At time $t_2$, the sector 242' is shown to have moved to a location that overlaps equal portions of conductive regions 226, 228. Consequently, the electric fields produced by the conductive regions 226, 228 will be coupled via the sector 242' to the receptor element, while the electric field from conductive region 224 will be minimally coupled to the receptor element. The output signal $U_{OUT}$ will be largely determined by the action of the input signals $U_B$, $U_C$ on their respective capacitances created by the conductive regions 226, 228, the dielectric material of the sector 242', and the receptor element.

In accordance with the present invention, there is a one-to-one correspondence between the physical angular displacement of the rotating element 104 and the phase shift of the output signal $U_{OUT}$ with respect to one of the input signals $U_A$, $U_B$, or $U_C$ serving as a reference signal. This is explained in further detail in U.S. Pat. Nos. 5,872,408 and 6,101,084, and in pending U.S. application Ser. No. 11/413,420. For example, if the rotor is rotated by x° (geometrical), then the output signal $U_{OUT}$ will be phase shifted by substantially x° (electrical) with respect to one of the input signals $U_A$, $U_B$, or $U_C$. The present invention therefore, provides a direct indication of the angular position of the rotor.

This can be accomplished simply by monitoring changes in the phase difference between the output signal $U_{OUT}$ and one of the excitation signals, e.g., $U_A$, as the reference signal. At a given reference angular position of the rotating element 104, there will be reference-position phase difference $\phi_{REF}$ (which could be zero) between the output signal $U_{OUT}$ and the reference signal. As the rotating element 104 is turned, the change in phase difference between the reference signal $U_{REF}$ and the output signal $U_{OUT}$ will be substantially equal to the change in angular position of the rotating element from the reference position.

It is understood, of course, that in practice common signal processing will be required to obtain a usable signal. For example, A/D conversion may be needed to obtain a digital signal that a digital data processor can understand. There may be filtering of the measured output signal $U_{OUT}$ to filter out noise and amplification to improve the signal-to-noise ratio. These signal processing steps are commonly performed on any measured signal in order to obtain a usable signal. It is noted that these signal obtaining steps are not performed for the purpose of determining angular position, but only for the purpose of obtaining a usable signal. In accordance with the present invention, the usable signal thus obtained requires no additional signal manipulations beyond being compared to a reference signal in order to ascertain a phase difference and hence angular position.

Figure 5:
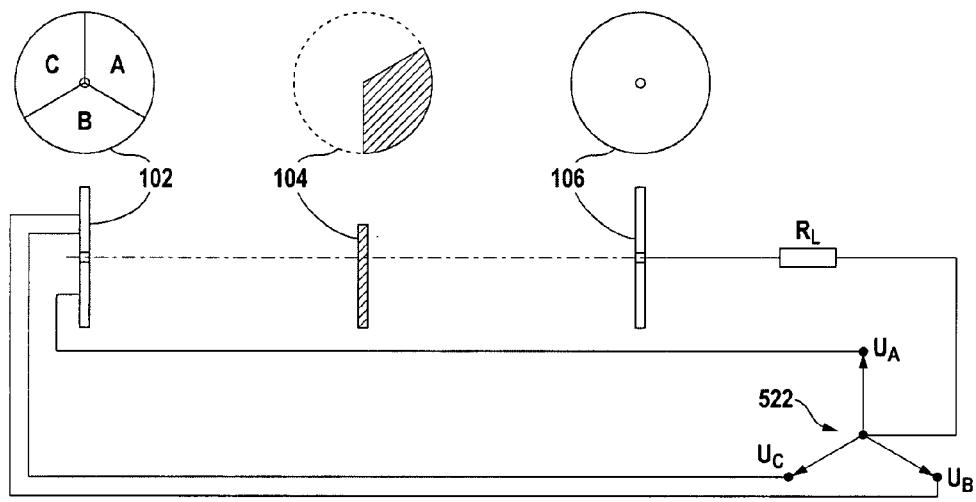
FIG. 5 presents a schematic representation of the sensor of FIG. 1.

FIG. 5 shows a schematic illustration of the sensor 100. The notation used in this figure is conventional notation used in describing multiphase systems. The figure illustrates a circuit diagram for driving the excitation element 102 and measuring the single output signal $U_{OUT}$ of the receptor element 106. Reference numeral 522 identifies a general representation of a multiphase signal source, in this case a three-phase source. Each phase serves as one of the input signals $U_A$, $U_B$, and $U_C$. The output signal $U_{OUT}$ is usually measured as a voltage across a load resistance $R_L$.

Figure 6:
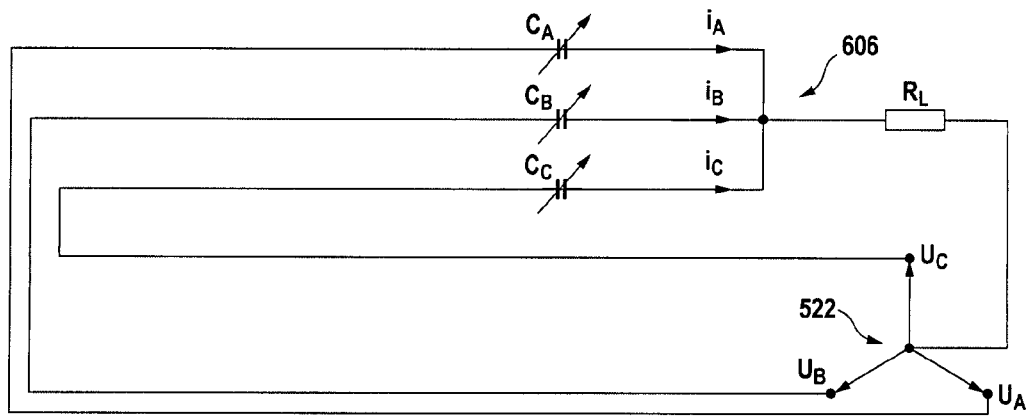
FIG. 6 is a circuit diagram that represents the sensor of FIG. 1.

FIG. 6 illustrates the circuit equivalent of the sensor 100. The three emitter regions which comprise the excitation element 102 and the electrically single conductive material 262 of the receptor element 106 are equivalent to three variable capacitors CA, CB, and Cc connected in a star configuration to a common point 606, where each capacitor is driven by a different excitation source. The signal generator 522 produces input signals $U_A$, $U_B$, and $U_C$ as defined by equations EQN 1 given above. The capacitors CA, CB, and Cc are variable due to the changing location of the dielectric material of the first portion 242 of the rotating element 104 as it turns.

Figure 7:
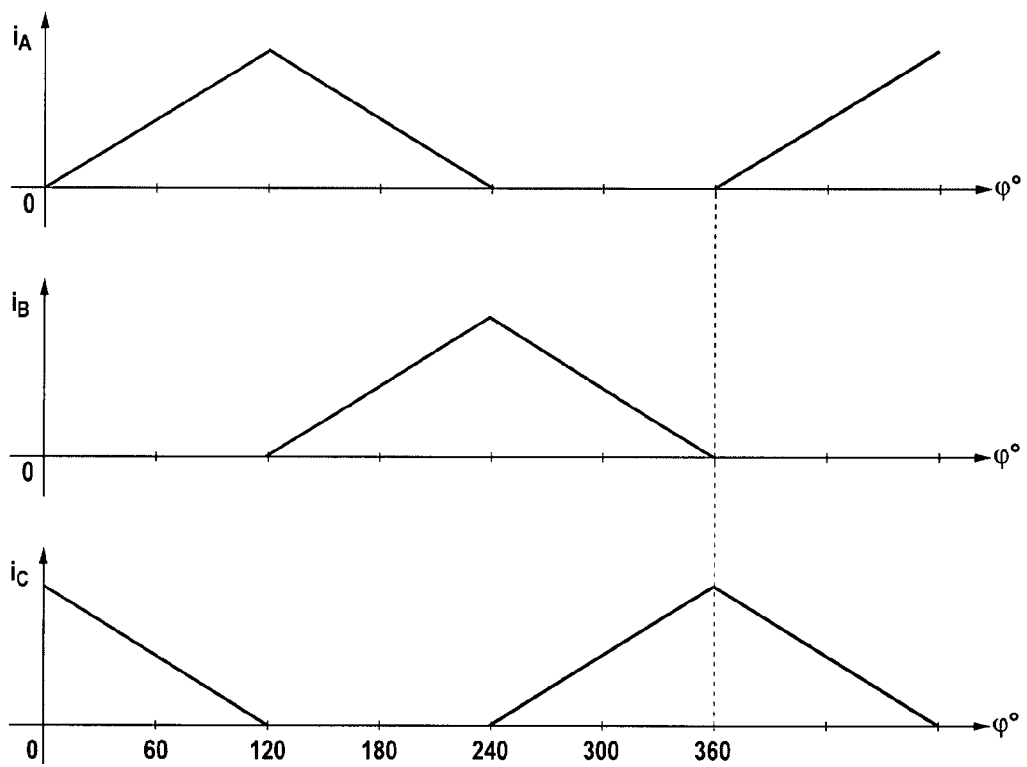
FIG. 7 illustrates current waveforms produced in the circuit of FIG. 6.

The amplitudes of the currents $i_A$, $i_B$, and $i_C$, shown in FIG. 7, are produced using the simpler rotating element 104' comprising only a single sector of dielectric material. In the case of the rotating element 104, where there a first portion dielectric material 242 and a second portion 246 of another material, the current amplitudes will vary depending on the material of the second portion. In general, the current amplitudes will depend on the number of portions and materials used to construct the rotating element 104.

Figure 8:
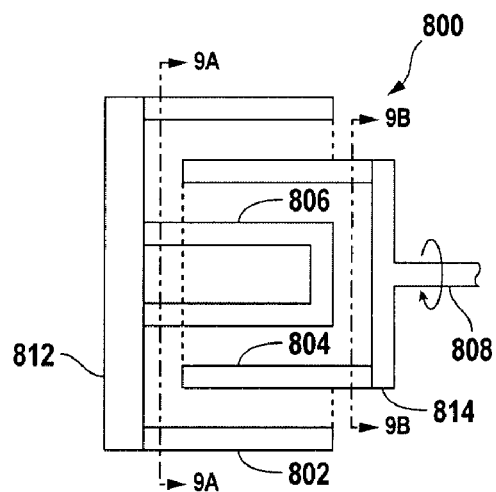
FIG. 8 illustrates a cylindrical variant of the sensor of FIG. 1.

FIG. 8 illustrates a second embodiment of a capacitive sensor 800 according to the present invention. The components of the sensor 800 are cylindrical elements rather than planar elements of the first embodiment; however, the operation is identical. Non-rotating excitation element 802 is configured to emit a plurality of electromagnetic fields, and corresponds to excitation element 102 of the embodiment shown in FIG. 1. Non-rotating receptor element 806 is configured to produce a single output signal in response to electromagnetic coupling of the electromagnetic fields emitted by the excitation element, and corresponds to the receptor element 106 shown in FIG. 1. As can be seen in the figure, the receptor element 806 is arranged concentrically with respect to the excitation element 802. The electromagnetic coupling occurs through the rotating element 804, which is concentrically disposed between the excitation element 802 and the receptor element 806. Rotating element 804 corresponds to rotating element 104 in FIG. 1. Rotation of the rotating element 804 is provided by shaft 808 connected to the rotating element 804.

Figure 9A:
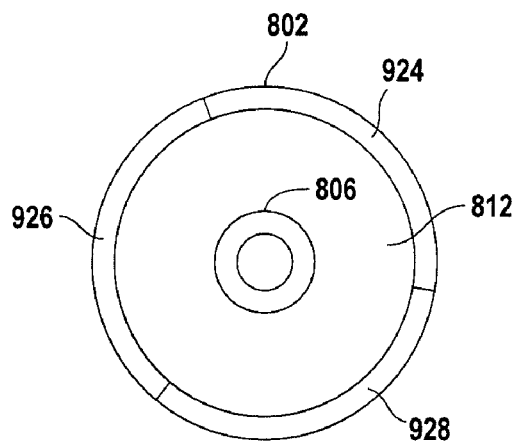
FIGS. 9A and 9B are cross-sectional views of the embodiment of FIG. 8.
Figure 9B:
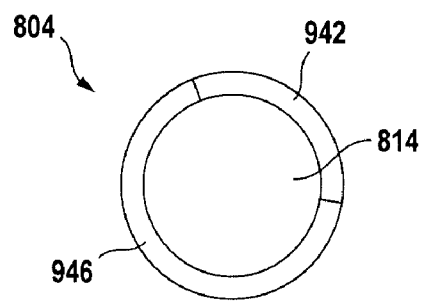

FIGS. 9A and 9B show cross-sectional views of the sensor 800 taken along view-lines 9A-9A and 9B-9B, respectively. As can be seen in the embodiment shown in FIG. 9A, excitation element 802 is a cylindrical member comprising three emitter components 924, 926, 928 shaped to fit together as a cylinder. The emitter components 924, 926, 928, which correspond to the emitter regions 224, 226, 228 shown in FIG. 2A, are electrically isolated from each other. A non-conductive base 812 provides a supportive attachment for the emitter components 924, 926, 928. The receptor element 806 is an electrically single conductive element that is attached to the base 812. Wire attachments (not shown) are easily provided to the emitter components 924, 926, 928 of the excitation element 802 and to the receptor element 906 because these parts do not rotate; for example, passing wires through openings in the base 812 and connecting them to the emitter components 924, 926, 928 and the receptor element 906. The sensor 800 is energized in the same way as described above for sensor 100, and the output is detected in the same manner as in sensor 100.

Figure 10A:
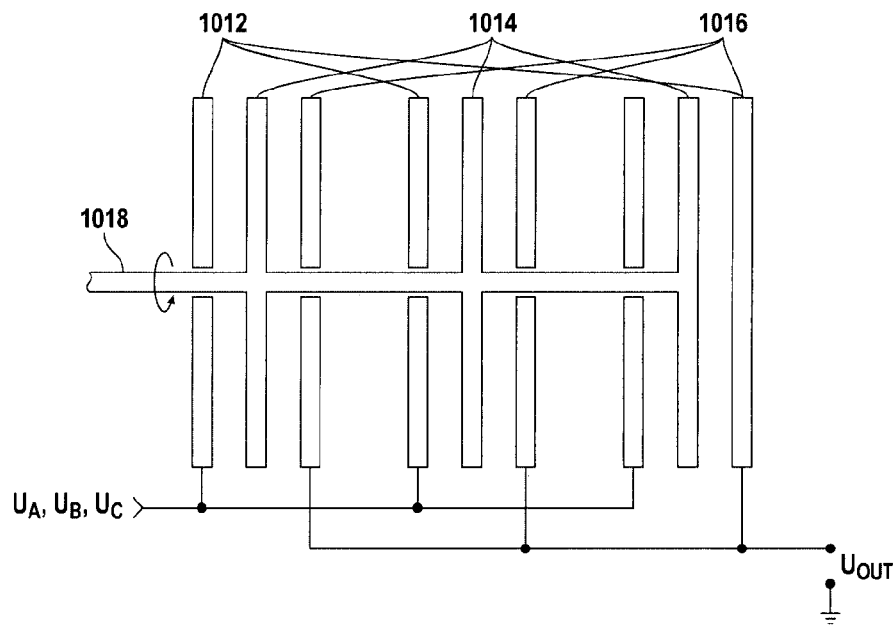
FIGS. 10A and 10B illustrate variants of the sensors respectively illustrated in FIGS. 1 and 8.

FIG. 10A illustrates an example of a variation of the sensor 100 of FIG. 1, where the excitation element 1012, the rotating element 1014, and the receptor element 1016 each comprises a set of disks. Each of the disks of the rotating element 1014 is connected to a shaft 1018. The excitation element 1012 and the receptor element 1014 can be attached to a suitable support structure (not shown) since these elements do not rotate. Assuming a three-phase embodiment, the disks of the excitation element 1012 each is driven (or energized) by input signals $U_A$, $U_B$, and $U_C$ as discussed above for excitation element 102 of sensor 100 in FIG. 1. The disks of the receptor element 1016 are connected together to provide the single output signal $U_{OUT}$. The disks of the rotating element 1014 each is constructed as described above for rotating element 104. The sensor is assembled as shown in the figure by appropriately interleaving the disks. The resulting increase in surface area allows for increased charge accumulation on the receptor element 1016, and hence produces a stronger output signal thus improving the signal to noise ratio of the sensor.

Figure 10B:
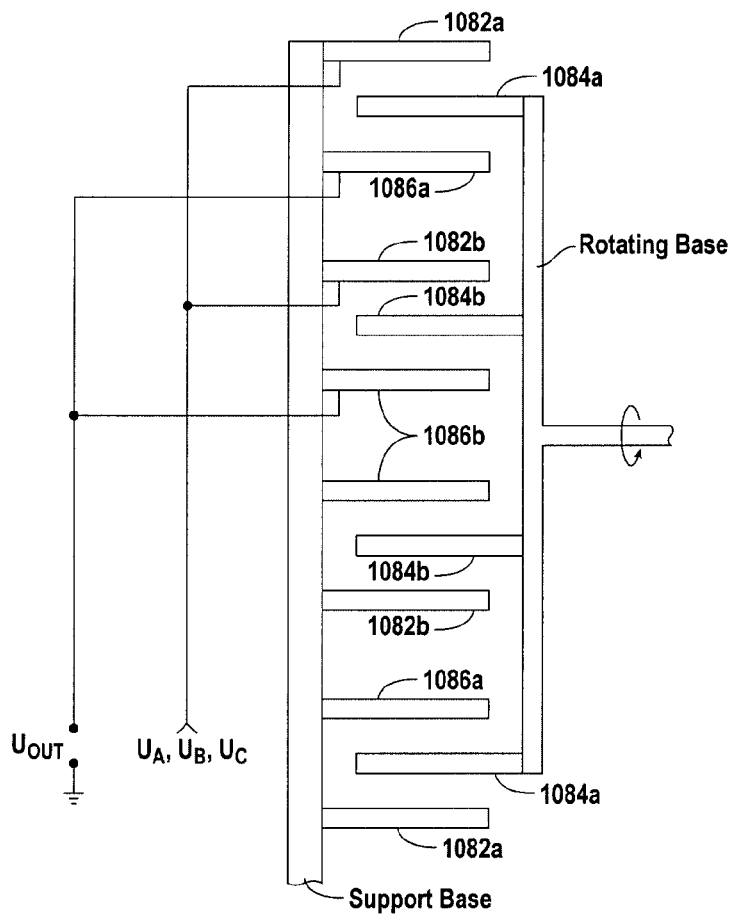

FIG. 10B is a cross-sectional view that illustrates an example of a variation of the sensor 800 of FIG. 8, where the excitation element, the rotating element, and the receptor element each comprises a set of concentric cylinders. For example, cylinders 1082a, 1082b which constitute the excitation element are disposed on support base. Cylinder 1082b fits within and is concentrically aligned with cylinder 1082a. Also disposed on the support base are cylinders 1086a, 1086b which constitute the receptor element. The receptor element cylinders 1086a, 1086b are arranged relative to the excitation element cylinders 1082a, 1082b such that concentric pairs of excitation and receptor cylinders are formed. For example, cylinders 1082a and 1086a form a pair and cylinders 1082b and 1086b form a pair. Cylinders 1084a, 1084b which constitute the rotating element are disposed on a rotating base, where cylinder 1084b fits within and is concentrically aligned with the outer cylinder 1084a.

Again, assuming a three-phase embodiment, the cylinders 1082a, 1082b of the excitation element each is driven (or energized) by input signals $U_A$, $U_B$, and $U_C$ as discussed above for excitation element 802 of sensor 800 in FIG. 8. The cylinders 1086a, 1086b of the receptor element are connected to provide the single output signal $U_{OUT}$. The cylinders 1084a, 1084b of the rotating element each is sized and arranged on the rotating base to rotate between cylinder pairs 1082a/1082a and 1082b/1082b, respectively. The resulting increase in surface area due to this interleaving of the elements allows for increased charge accumulation on the receptor element cylinders 1086a, 1086b, and hence produces a stronger output signal thus improving the signal to noise ratio of the sensor.

Figure 11:
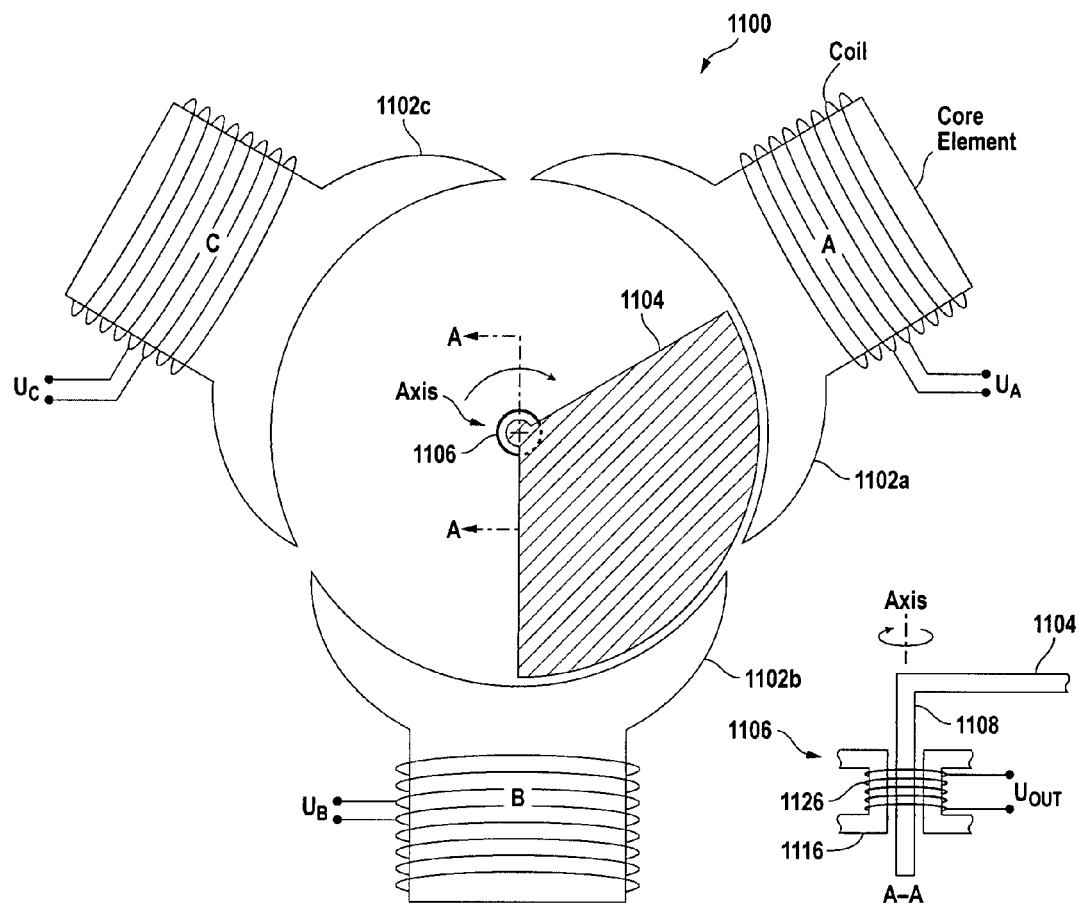
FIG. 11 shows an illustrative embodiment of an inductive sensor of angular position according to the present invention.

FIG. 11 shows an example of an inductive sensor of angular position 1100 embodied in accordance with the present invention. A three-phase sensor will be described; however, it will be apparent that, in the general case, the present invention can be embodied in an N-phase sensor. The sensor 1100 comprises three emitter elements 1102a, 1102b, 1102c which collectively constitute the non-rotating excitation element of the sensor. In this embodiment of the present invention, the emitter elements 1102a, 1102b, 1102c are electromagnets. Each emitter element 1102a, 1102b, 1102c comprises a metallic core about which a coil is wound. The harmonic multi-phase input signals $U_A$, $U_B$, and $U_C$ disclosed above are respectively provided to the coils of emitter elements 1102a, 1102b, 1102c. The resulting electromagnetic fields are magnetic in nature, and can also be referred to simply as magnetic fields.

The rotating element 1104 is shown in FIG. 11 as a 120° wedge-shaped element (sector) and is configured for rotation about an axis. The view lines A-A represents a view of through the sensor 1100 in a direction perpendicular to the drawing in the figure. The view along view lines A-A is shown in the inset in FIG. 11. The rotating element 1104 is connected to a shaft 1108, which in turn can be connected to a rotating device for which knowledge of its angular position is desired. The rotating element 1104 is connected to the shaft 1108. The rotating element 1104 and the shaft 1108 each is of a material that is characterized by a magnetic permeability μ that may or may not be equal to each other, thus providing a path of magnetic flux between the rotating element and the shaft.

Figure 12:
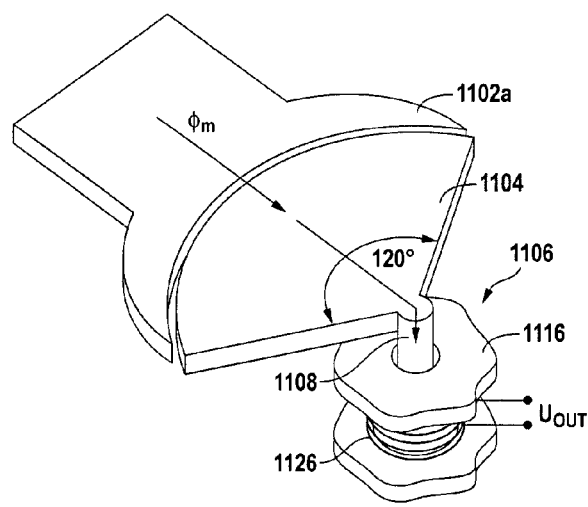
FIG. 12 shows a perspective view of showing additional details of the sensor of FIG. 11.

As can be seen in the inset in FIG. 11, the non-rotating receptor element 1106 comprises a stationary bobbin 1116 about which a coil of wire 1126 is wound. The bobbin 1116 is disposed around and spaced apart from shaft 1108, allowing the shaft to rotate while the bobbin remains stationary. An induced current flow through the coil of wire 1126 can be measured and used to provide the single output signal $U_{OUT}$. The perspective view of this portion of the sensor 1100, shown FIG. 12, illustrates some of the construction details in more detail.

Operation of the inductive sensor 1100 is similar to operation of capacitive sensor 100 discussed above. When the coils of the emitter elements 1102a, 1102b, 1102c of sensor 1100 are respectively energized by the time-varying multiphase input signals $U_A$, $U_B$, and $U_C$, each emitter element will emit an electromagnetic field. In the case of inductive sensor 1100, the electromagnetic fields are magnetic in nature. As the rotating element 1104 rotates in proximity to each of the emitter elements 1102a, 1102b, 1102c, the magnetic fields emanating from the emitter elements will be coupled by magnetic induction to the rotating element. This creates a magnetic field in the rotating element 1104 and in the shaft 1108. Since the input signals $U_A$, $U_B$, and $U_C$ are time-varying signals, the magnetic field created in the rotating element 1104 and the shaft 1108 likewise is time-varying. The varying magnetic field emanating from the shaft 1108 induces a current in the coil of the receptor element 1106. The resulting current flow in the coil is measured as the single output signal $U_{OUT}$.

Since the rotating element 1104 is wedge-shaped, there will be times when there is no magnetic coupling, or very reduced magnetic coupling, of the magnetic fields emanating from one or more of the emitter elements 1102a, 1102b, 1102c. For example, when the rotating element 1104 is aligned adjacent to emitter element 1102a, then the magnetic coupling between the element 1102a and the rotating element will be maximal, while the magnetic coupling between the rotating element and the elements 1102b and 1102c will be minimal. The magnetic field created in the rotating element 1104, and hence the output signal $U_{OUT}$, will result primarily of the contribution of the magnetic coupling of the magnetic field produced by element 1102a. As the rotating element 1104 continues to rotate and is aligned partially adjacent to elements 1102a and 1102b, the magnetic field created in the rotating element and hence the output signal $U_{OUT}$, will result from contributions from the magnetic fields of elements 1102a and 1102b. The graphs in FIG. 3 characterize this behavior.

Figure 13:
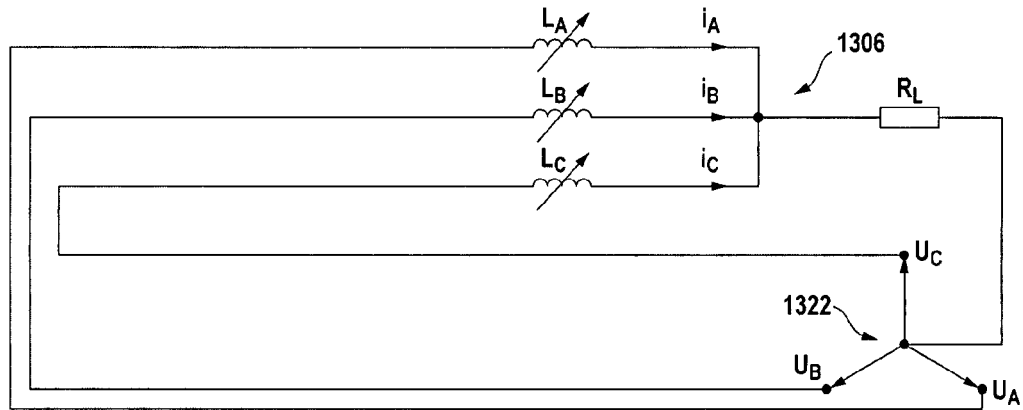
FIG. 13 shows a circuit diagram that represents the sensor of FIG. 11.

FIG. 13 illustrates the circuit equivalent of the inductive sensor 1100. The three emitter elements 1102a, 1102b, 1102c which comprise the excitation element of the sensor and receptor element 1106 coupled via the rotating element 1104 are represented as three variable inductors $L_A$, $L_B$, and $L_C$ connected in a star configuration to a common point 1306. The signal generator 1322 produces the three-phase input signals $U_A$, $U_B$, and $U_C$ as defined by equations EQN 1 given above. The inductors $L_A$, $L_B$, and $L_C$ are variable due to the changing location of the rotating element 1104 as it rotates. The amplitudes of the currents $i_A$, $i_B$, and $i_C$ are substantially similar to those shown in FIG. 7 for capacitive sensor 100.

As in the case of the capacitive sensor 100, the inductive sensor embodiment of the present invention is suitable for use in detecting angular position. Like the capacitive sensor 100, the inductive counterpart can provide a direct indication of the angular position of the rotating element 1104. As in the case of the capacitive sensor, this can be accomplished simply by monitoring changes in the phase difference between the output signal $U_{OUT}$ and one of the excitation signals, e.g., $U_A$, as the reference signal. At a given reference angular position of the rotating element 1104, there will be reference-position phase difference $\phi_{REF}$ (which could be zero) between the output signal $U_{OUT}$ and the reference signal. As the rotating element 1104 is turned, the change in phase difference between the reference signal $U_{REF}$ and the output signal $U_{OUT}$ will be substantially equal to the change in angular position from the reference position.

Figure 14:
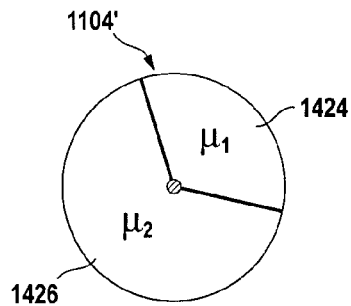
FIG. 14 shows an alternative embodiment of the rotating element shown in FIG. 11.

FIG. 14 show another embodiment of the rotating element 1104. In FIG. 14, rotating element 1104' comprises a first portion 1424 of a material having a first magnetic permeability $\mu_1$, and at least a second 1426 of another material having a second magnetic permeability $\mu_2$ different from $\mu_1$. The rotating element 1104' may comprise additional portions as well. The principle of operation is the same. As the rotating element 1104' turns, the amount electromagnetic coupling of the electromagnetic fields produced by the emitter elements 1102a, 1102b, 1102c to the rotating element will vary. The resulting induced current in the receptor element 1106 will likewise vary and can be measured. This configuration would be suitable where a rotationally balanced structure is required.

Figure 15:
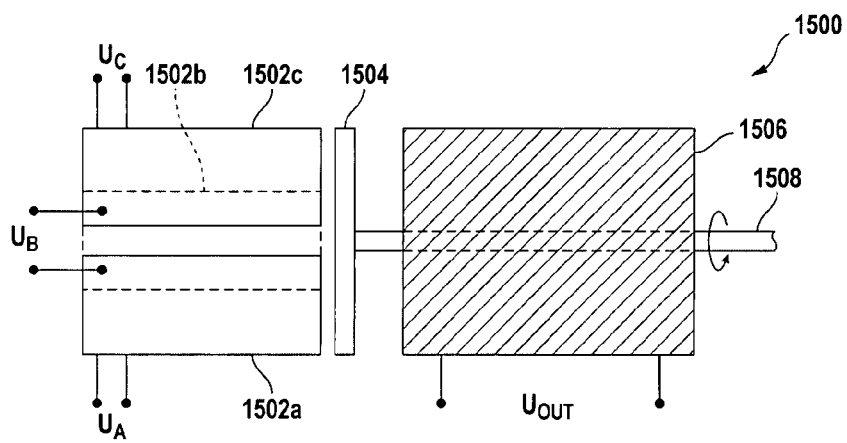
FIG. 15 shows a variant of the sensor of FIG. 11.

FIG. 15 illustrates another embodiment of an inductive sensor 1500 according to the present invention. The inductive sensor 1100 had a "bent" inductive path, where the magnetic fields of the emitter elements 1102a, 1102b, 1102c were coupled to the rotating element 1104 in one plane and the magnetic field created in the rotating element and shaft is coupled to the receptor element 1108 in a different plane. In the case of inductive sensor 1500, the inductive path is "straight", all of the magnetic coupling occurs substantially in the same plane.

The emitter elements 1502a, 1502b, 1502c constitute the excitation element, and are similar to the embodiment disclosed above. The rotating element 1504 is substantially similar to the foregoing disclosed embodiments and is connected to a shaft 1508. The rotating element 1504 and the shaft 1508 each is of a material that is characterized by a magnetic permeability μ that may or may not be equal to the other material, thus providing a path of magnetic flux between the rotating element and the shaft The shaft 1508 passes through a receptor element 1506 which is collinearly arranged with respect to the emitter elements 1502a, 1502b, 1502c. Of course, it can be appreciated that other variations of the inductive sensor can be constructed.

Operation of sensor 1500 is similar to that of sensor 1100. The magnetic fields from the emitter elements 1502a, 1502b, 1502c couple to the rotating element 1504. A corresponding magnetic field is created in the shaft 1508. The magnetic field created in the shaft 1508 induces a flow of current in the coil comprising the receptor 1506 which is then measured and serves as the output signal $U_{OUT}$.

Both the capacitive and inductive sensors disclosed above are governed by the principles of electromagnetic theory. However, differences in technical properties and construction will dictate their suitability in different areas of use. For example, the capacitive sensor is simple in construction, and lends itself to implementation using mass production techniques including microelectronic manufacturing and nanotechnology fabrication.

Inductive angular position sensors, on the other hand, require the manufacture of coil windings. It is well known fact, that systems with windings are not easily adapted for microelectronic manufacturing techniques. Nonetheless, inductive position sensors still find use in certain applications, including for example electromechanical devices such as brushless DC motors where angular position information is necessary for proper operation. Inductive sensors also produce a stronger output signal, and thus generally offer better signal to noise performance as compared capacitive sensors.

In some applications (e.g., motors), the inductive sensor according to the present invention can simplify the design because the function of torque production and the function of obtaining an information signal indicative of angular position of the rotor use the same system of stator poles and windings. This advantageous aspect of the present invention arises from the constructional similarities between a motor and a sensor according to the present invention. Both utilize a multi-phase excitation system and have corresponding poles and windings. In this case, the sensor may not have separate poles with windings, and the general construction of a combined motor and sensor can be effectively simplified. This make the inductive sensor of the present invention an attractive design element for use in control of electromechanical devices.

What is claimed is:

1. An angular position sensor comprising:
    a rotating element;
    a non-rotating excitation element configured to emit a plurality of electromagnetic fields; and
    a non-rotating receiver element,
    said rotating element disposed in juxtaposition to said non-rotating excitation element and to said non-rotating signal receiver element,
    said plurality of electromagnetic fields produced by said non-rotating excitation element being electromagnetically coupled to said non-rotating receiver element through said rotating element,
    said non-rotating receiver element characterized in producing a single output signal in response to exposure to said plurality of electromagnetic fields,
    said rotating element characterized in that it varies the electromagnetic coupling of said plurality of electromagnetic fields between said non-rotating excitation element and said non-rotating receiver element as said rotating element rotates,
    wherein said non-rotating excitation element and said non-rotating receiver element are capacitively coupled, said rotating element comprising a first portion of dielectric material and at least a second portion of a material different from the dielectric material of the first portion,
    wherein said material of said second portion is a dielectric material different from the dielectric material of the first portion.

2. The sensor of claim 1 wherein the phase of said single output signal varies as the angular position of said rotating element varies.

3. The sensor of claim 1 wherein the phase of said single output signal is indicative of the angular position of said rotating element.

4. The sensor of claim 1 wherein said non-rotating excitation element is energized by a multiphase excitation signal.

5. The sensor of claim 1 wherein said non-rotating excitation element comprises a plurality of electrically isolated emitters, each emitter emitting one of said electromagnetic fields.

6. The sensor of claim 1 wherein said rotating element has either a wedge shape or a disk shape.

7. The sensor of claim 1 wherein said rotating element has a cylindrical shape.

8. The sensor of claim 1 wherein said material of said second portion is not a dielectric material.

9. An angular position sensor comprising:
    a rotating element;
    a non-rotating excitation element configured to emit a plurality of electromagnetic fields; and
    a non-rotating receiver element,
    said rotating element disposed in juxtaposition to said non-rotating excitation element and to said non-rotating signal receiver element,
    said plurality of electromagnetic fields produced by said non-rotating excitation element being electromagnetically coupled to said non-rotating receiver element through said rotating element,
    said non-rotating receiver element characterized in producing a single output signal in response to exposure to said plurality of electromagnetic fields,
    said rotating element characterized in that it varies the electromagnetic coupling of said plurality of electromagnetic fields between said non-rotating excitation element and said non-rotating receiver element as said rotating element rotates,
    wherein said wherein said non-rotating excitation element and said non-rotating receiver element are inductively coupled, said rotating element characterized by having at least a first magnetic permeability and a second magnetic permeability different from said first magnetic permeability.

10. The sensor of claim 9 wherein said rotating element has a wedge shape.

11. An angular position sensor comprising:
    a plurality of non-rotating exciter elements, the exciter elements being electrically isolated from each other;
    a non-rotating receptor element; and
    a rotor element disposed between said non-rotating exciter elements and said non-rotating receptor element, said rotor element configured to rotate about an axis of rotation, said rotor element comprising a first portion of a dielectric material and a second portion of a material different from said dielectric material,
    said non-rotating receptor element configured to produce a single time-varying output voltage signal when a plurality of time-varying input voltage signals are applied respectively to said plurality of exciter elements, wherein the phase of said single time-varying output voltage signal varies as the angular position of said rotor element varies, wherein said material of said second portion is a dielectric material different from said dielectric material of said first portion.

12. The sensor of claim 11 wherein said exciter element and said receptor element have a planar shape.

13. The sensor of claim 11 wherein said exciter element and said receptor element are disk-shaped.

14. The sensor of claim 11 wherein said exciter element and said receptor element are cylindrical.

15. The sensor of claim 11 wherein said time-varying input voltage signals each has a different phase from the other time-varying input voltage signals.

16. The sensor of claim 11 wherein said receptor element is of a single material.

17. The sensor of claim 11 wherein said material of said second portion is not a dielectric material.

18. An angular position sensor comprising:
a plurality of non-rotating exciter elements, the exciter elements being electrically isolated from each other;
a non-rotating receptor element; and
a rotor element disposed between said non-rotating exciter elements and said non-rotating receptor element, said rotor element configured to rotate about an axis of rotation, said rotor element comprising a first portion of a dielectric material and a second portion of a material different from said dielectric material,
said non-rotating receptor element configured to produce a single time-varying output voltage signal when a plurality of time-varying input voltage signals are applied respectively to said plurality of exciter elements wherein the phase of said single time-varying output voltage signal varies as the angular position of said rotor element varies,
wherein said rotor element is characterized by having two or more different dielectric constants.

19. An angular position sensor comprising:
a transmitting stator comprising a plurality of electrically isolated transmitter elements, each transmitter element configured to produce a magnetic field when it is energized, thereby producing a plurality of magnetic fields when two or more of said transmitter elements are energized;
a receiving stator; and
a rotor disposed in juxtaposition to said transmitting stator and to said receiving stator, said rotor configured to rotate about an axis of rotation, said rotor providing electromagnetic coupling of said plurality of magnetic fields to said receiving stator when said plurality of transmitter elements are energized,
said receiving stator producing a single output signal when said plurality of magnetic fields are electromagnetically coupled thereto by said rotor,
said rotor characterized by having at least a first magnetic permeability and a second magnetic permeability, wherein the phase of said single output signal varies as the angular position of said rotor varies during rotation of said rotor.

20. The sensor of claim 19 wherein each transmitter element is an electromagnet, and said receiving stator comprises a coil, wherein said plurality of magnetic fields produced by said transmitter elements are coupled to said coil thus inducing a flow of current in said coil, said single output signal being a measure of said flow of current.

21. The sensor of claim 19 wherein said rotor is substantially coplanar with said transmission stator, wherein said rotor is connected to a shaft, wherein said receiving stator is disposed about said shaft.

22. The sensor of claim 9 wherein said non-rotating excitation element comprises a plurality of electrically isolated emitters, each emitter emitting one of said electromagnetic fields.

23. The sensor of claim 9 wherein said rotating element has either a wedge shape or a disk shape.

24. The sensor of claim 9 wherein said rotating element has a cylindrical shape.

25. The sensor of claim 18 wherein said exciter element and said receptor element are cylindrical.

* * * * *